No. 760,205. PATENTED MAY 17, 1904.
J. J. HICKEY.
SEWER DIGGING MACHINE.
APPLICATION FILED MAY 21, 1903.
NO MODEL. 5 SHEETS—SHEET 1.
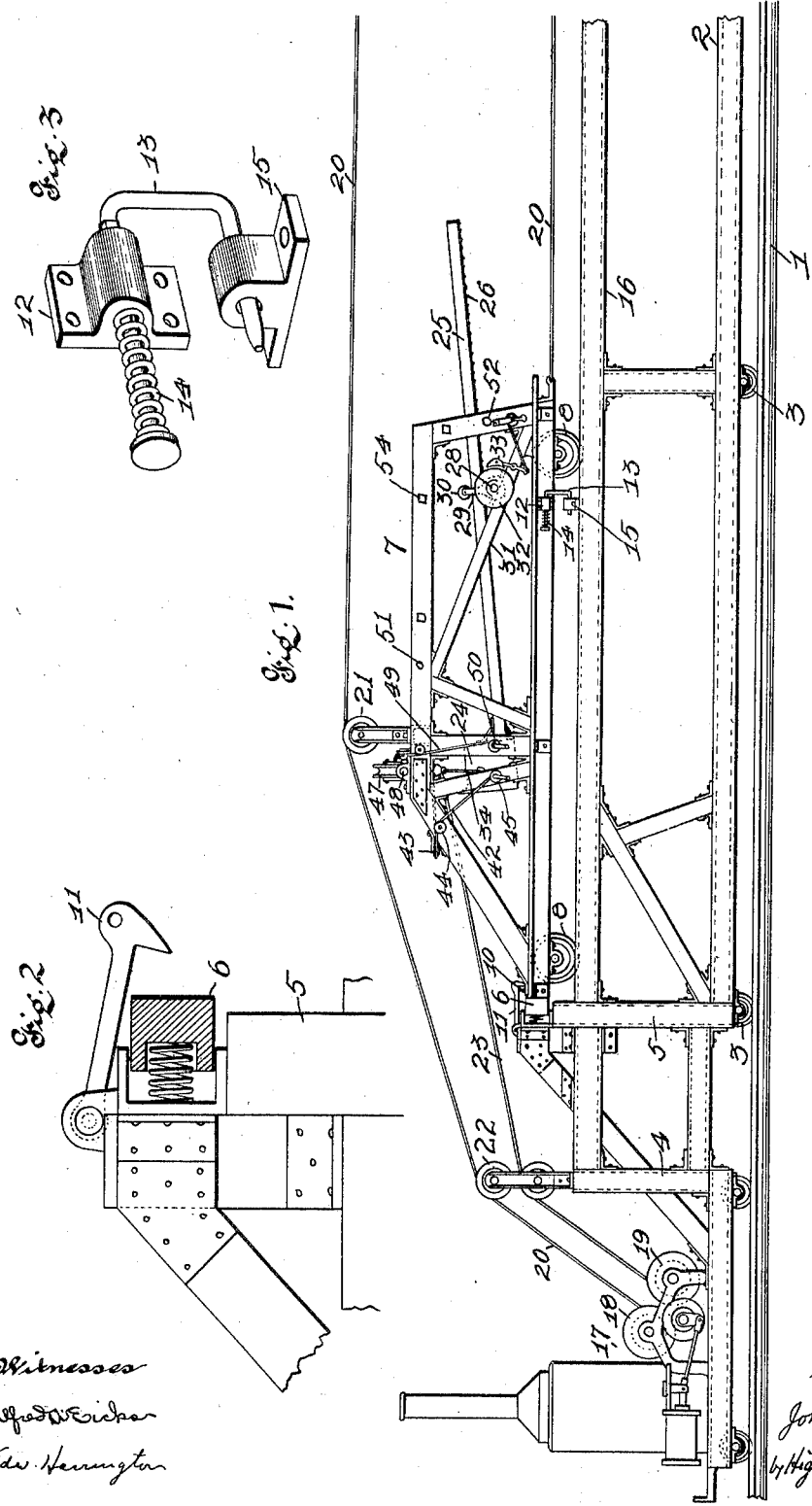

No. 760,205. PATENTED MAY 17, 1904.
J. J. HICKEY.
SEWER DIGGING MACHINE.
APPLICATION FILED MAY 21, 1903.
NO MODEL. 5 SHEETS—SHEET 2.
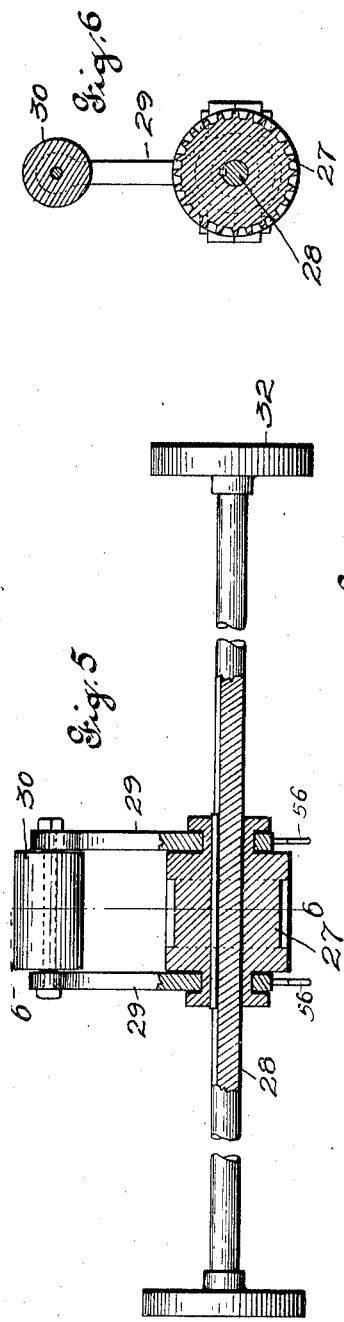
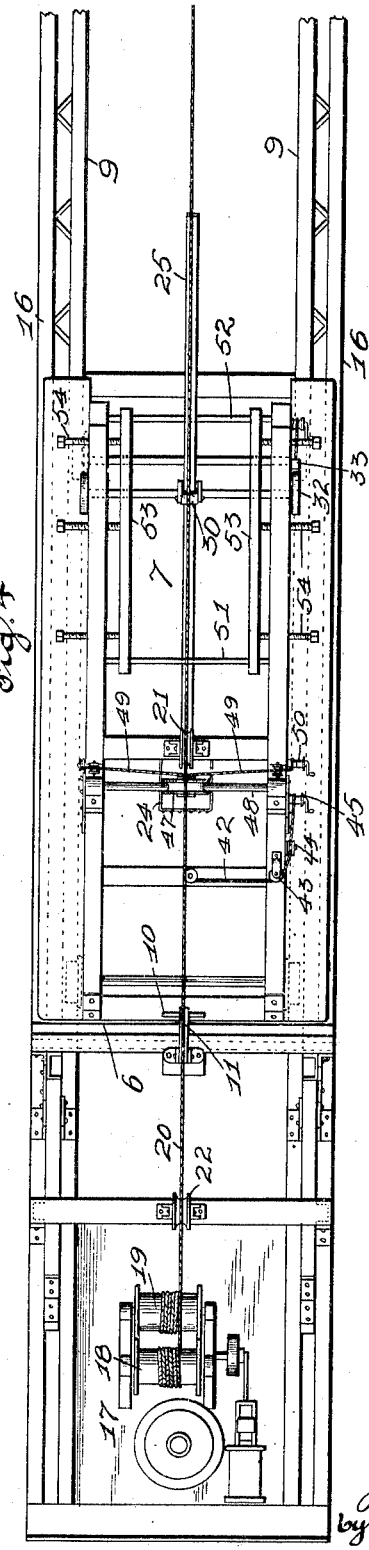
Witnesses
Alfred A. Eicks
Edw. Harrington
Inventor
John J. Hickey
by Higdon & Longan & Hopkins
Attys

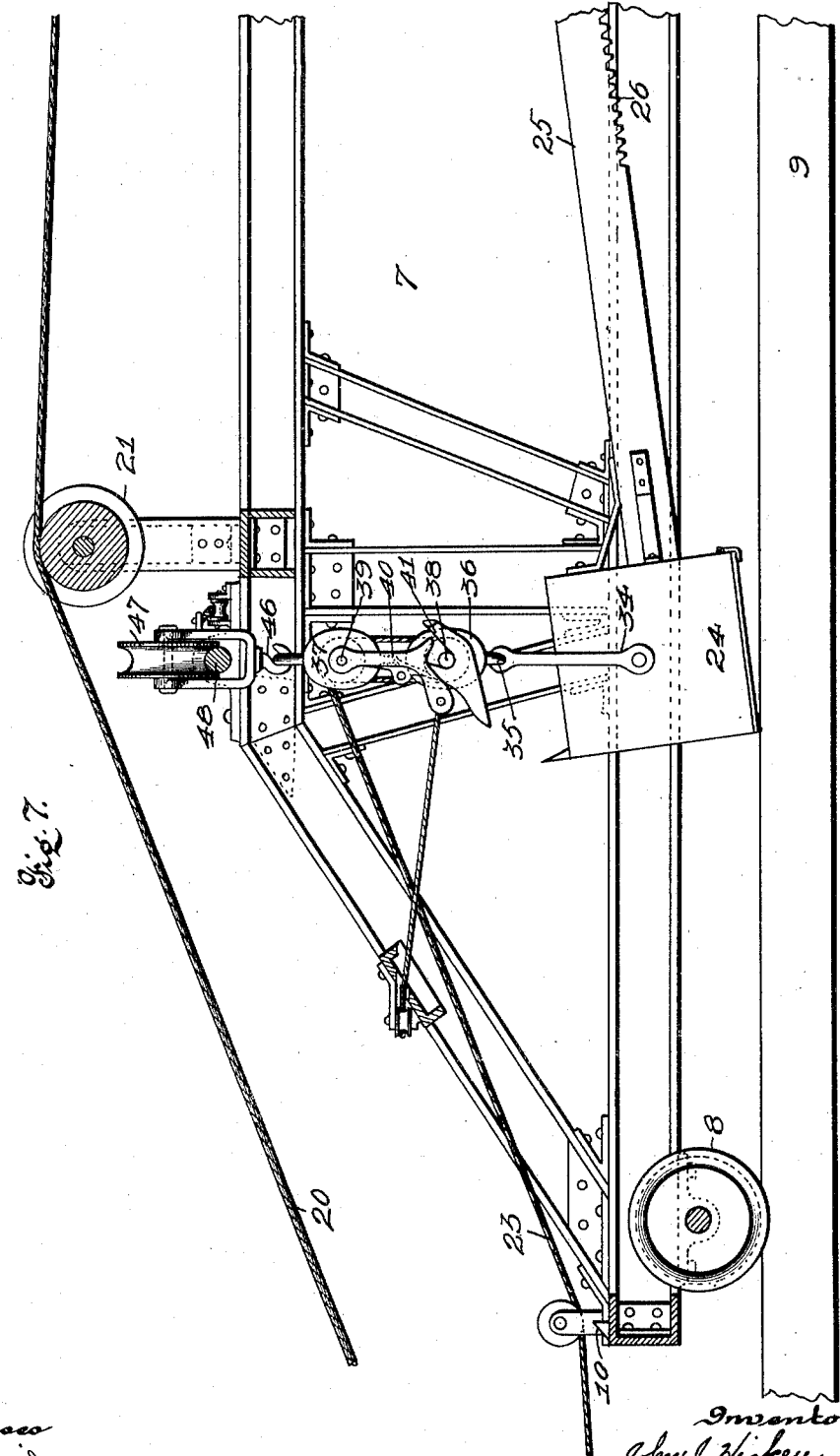

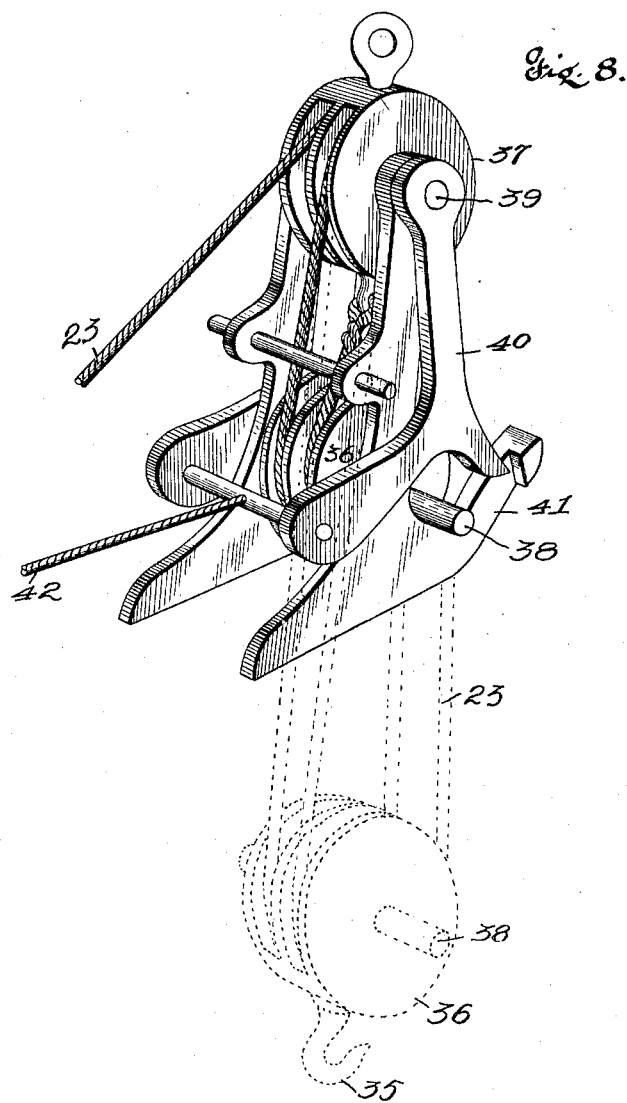

No. 760,205. PATENTED MAY 17, 1904.
J. J. HICKEY.
SEWER DIGGING MACHINE.
APPLICATION FILED MAY 21, 1903.
NO MODEL. 5 SHEETS—SHEET 5.
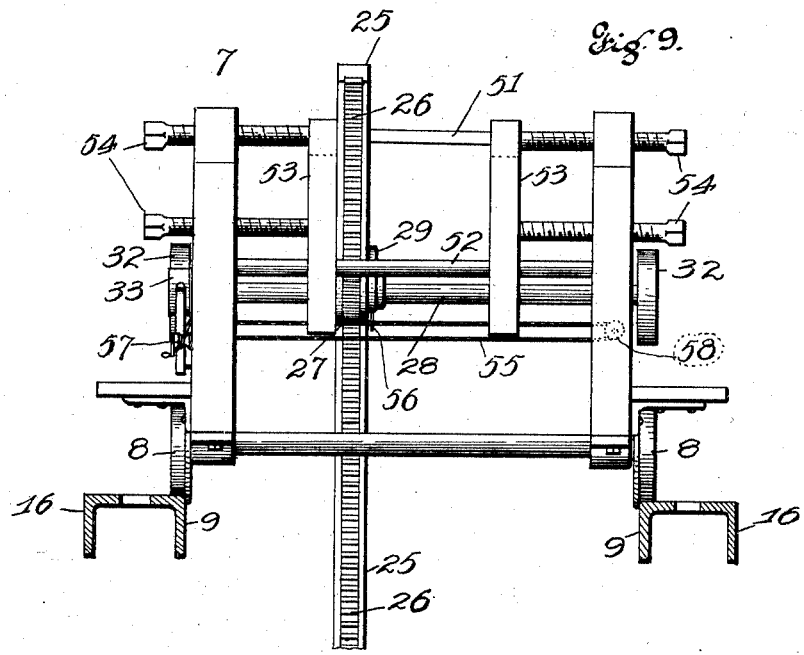
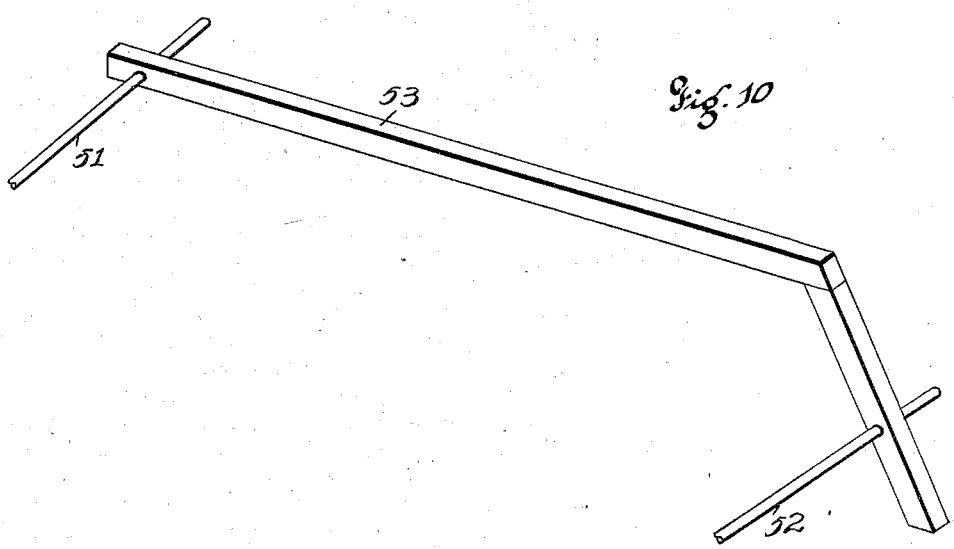

No. 760,205.

Patented May 17, 1904.

UNITED STATES PATENT OFFICE.

JOHN J. HICKEY, OF ST. LOUIS, MISSOURI.

SEWER-DIGGING MACHINE.

SPECIFICATION forming part of Letters Patent No. 760,205, dated May 17, 1904.

Application filed May 21, 1903. Serial No. 158,169. (No model.)

*To all whom it may concern:*

Be it known that I, JOHN J. HICKEY, a citizen of the United States, residing at St. Louis, State of Missouri, have invented certain new and useful Improvements in Sewer-Digging Machines, of which the following is a specification containing a full, clear, and exact description, reference being had to the accompanying drawings, forming a part hereof.

My invention relates to an improved sewer-digging machine, and has for its object to provide improved means for the excavation of sewers, trenches, and the like and the removal or discharge of the excavated material.

In the drawings, Figure 1 is a side view of a device embodying my invention. Fig. 2 is a side sectioned view of the spring-buffer and catch. Fig. 3 is a perspective of the holding device used upon the side of the carriage. Fig. 4 is a top view of the device embodying my invention. Fig. 5 is a front view of the shaft over which the bucket-handle is carried, showing the pinion in section. Fig. 6 is a sectional view of the said shaft and its attached roller, taken along the line 6 6 of Fig. 5. Fig. 7 is an enlarged view of the forward portion of the carriage used in my invention, showing the excavating-bucket and its attachments. Fig. 8 is a perspective of the block-and-tackle mechanism by which the bucket is operated. Fig. 9 is a detail view of the carriage looking from the rear of the machine shown in Fig. 1. Fig. 10 is a detail perspective view of one of the lateral bucket-handle guides.

My machine is intended to be stationed upon and to travel over the rails 1.

My machine itself consists of the following combination of elements, including a main frame 2, carried by wheels 3 and provided with the upright members 4 and 5: At the top of the member 5 the buffer 6 is placed to receive the impact of the front of the carriage 7, which carriage is provided with wheels 8, traveling upon rails 9. The carriage 7 is provided at its front end with the upwardly-projecting ear 10, which is adapted to engage with the catch 11, which is pivotally mounted above the buffer 6 at the top of the upright member 5. The sides of the carriage 7 are provided with the brackets 12, in which the U-shaped pins 13 are mounted, which pins 13 are provided with springs 14 and have depending points which are adapted to engage with lugs 15 upon the truss members 16 to hold the carriage 7 rigidly in place during the operation of excavating. Upon the front end of the main frame 2 an engine 17 of any desired type is placed to actuate the drums 18 and 19. The carriage 7 is moved backwardly and away from the engine 17 by means of winding the rope 20 upon the drum 18, the rope 20 being fastened to the rear of the carriage 7, passing around a pulley at the rear end of the main frame 2, thence over the sheaves 21 and 22 to the drum 18. The carriage 7 is brought toward the front of the main frame by means of the rope 23, which is wound upon the drum 19.

The operation of excavating is performed by means of the bucket 24, which is rigidly mounted upon the end of the handle 25, which handle is provided with a rack 26, the rack 26 being adapted to engage with the teeth of the pinion 27, mounted on the shaft 28. At either side of the pinion 27 the arms 29 project upwardly to carry the roller 30, which roller is adapted to keep the rack 26 upon the handle 25 in engagement with the teeth of the pinion 27. The shaft 28 is mounted upon the members 31 and is provided at each extremity with wheels 32, the movement of which wheels 32 is controlled by means of the brake 33. The bucket 24 is provided with the pivoted handle 34, which is held by the hook 35, depending from the block 36. The block 36 is mounted beneath the block 37, and they are connected by means of the rope 23, which passes through the blocks in the manner shown in Fig. 8. When the bucket is lowered into the trench for the purpose of excavating, the block 36 is permitted to follow the bucket 24, so that it occupies the position shown by the dotted lines in Fig. 8. The block 36 is provided with the pintles 38, and the block 37 is provided with pintles 39, which pintles 39 carry the depending frame members 40 and 41. When the bucket 24 has excavated its material, it is drawn upwardly by means of the rope 23 until the pintles 38 are caught and held by the members 41, as indicated in Fig. 8. When it is desired to release the block 36 and bucket 24 to permit them to again descend, such release is accomplished by means of a pull exerted upon the rope 42, which is attached to the forward part of the frame member 40, passes around the sheave 43, over the sheave 44, and to the windlass 45, upon which it is wound or unwound to pull the frame members 40 and 41 forward and out of engagement with the pintles 38 or to release such frame members 40 and 41 in order that they may hang in position to engage with and catch the pintles 38 when the block 36 is elevated. The block 37 is suspended by means of the hook 46, depending from the wheel 47, carried by the transverse shaft 48, which last-named devices are for the purpose of enabling the bucket 24 to travel from side to side of the carriage 7 in order to excavate material to the entire width of the surface exposed beneath the side members of the carriage 7. The wheel 47 is pulled from side to side of the carriage 7 by means of the rope 49 and windlass 50. The frame of the carriage 7 is provided with transverse bars 51 and 52, upon which are mounted the longitudinal members 53, which are capable of lateral adjustment by means of the set-screws 54. The function of the longitudinal members 53 is to serve as a lateral rest or support for the handle 25 when it is desired to excavate to a maximum width or a little greater than the total width of the carriage 7, in which event the bucket 24 may be moved from side to side in the trench or excavation to a point without the plane of the side members of the carriage 7 to a position in which the handle 25 will rest against one of the members 53 and will be steadied thereby. The pinion 27 is, as shown in Fig. 5, splined upon the shaft 28, so that said pinion and the rack-handle 25 may be moved laterally with the bucket.

The operation is as follows: When it is desired to make an excavation—say for a sewer or the like—the rails 1 are laid one upon each side of the location at which the excavation is to be made, and the machine is then mounted upon said rails with its supporting-wheels 3 upon said rails, as shown in Fig. 1. The carriage 7 should then be locked in position upon the main frame 2 by means of the catch 11 and the U-shaped pins 13. Said catch has its head beveled, so that its locking action will be automatically performed when the ear 10 on the carriage strikes the beveled head of said catch, as such action will raise the catch until the said ear passes beneath the same, when its own weight will cause the catch to resume its normal position, which is that shown in Fig. 2. The said catch 11 will prevent the carriage from moving backwardly upon the rails 9 of the main frame, and the common spring-buffer 6 will prevent said carriage from moving in an opposite direction. The U-shaped pins 13 when connected to the apertured lugs 15, as shown, very effectually lock the said carriage to the main frame and prevent its being lifted therefrom or tilted thereupon. I have found it necessary to rigidly lock the carriage to the main frame in order that I may utilize the additional weight of the main frame in digging, as the carriage would otherwise be displaced by the great upward thrust exerted by the bucket-handle 25 acting upon the pinion 27 and shaft 28. The position in which the parts are shown in Figs. 1, 4, 7, and 8 is that which I term the normal "working" position and in which the shovel is illustrated at the limit of its upward movement after having completed a stroke. When it is desired to discharge the contents of the bucket to cause the same to make another stroke, the catch 11 is first released, and then the engine 17 is run in such manner that the carriage 7 will be moved backwardly and away from the engine by winding the rope 20 upon the drum 18, which will also unwind the rope 23 a corresponding length from the drum 19. In this manner the carriage 7, carrying the bucket, may be run backwardly any suitable distance to the point of discharge, and the contents of the bucket may be dumped into the ditch in which the sewer-pipe has already been laid, thereby filling said ditch, or the contents of the bucket may be dumped directly into a wagon or any other suitable receptacle, as it will be seen the bottom of the bucket is of the common hinged form adapted to be released when it is desired to dump the contents. After the contents of the bucket have been dumped the drum 18 is released and the drum 19 is made to rotate, thereby rewinding the rope 23 upon the drum 19 and unwinding said rope 20 from said drum 18, and said rope 23 will thereby draw the carriage back to its normal position, where it will be held by the automatic catch 11 and U-shaped pins 13 in the manner previously described. The bucket should now be released in order that it may descend again to the earth. Its release and descent are accomplished as follows: The small windlass 45, Fig. 1, is operated to wind the rope 42 upon the same, and this will pull the locking frame members 40 41 forward and out of engagement with the pintles 38 of the block 36, and said block, carrying the bucket, will be permitted to descend. It should be explained that as the bucket descends in the manner just described the rack 26 of the bucket-handle causes the pinion 27 and brake-wheels 32 to rotate, and for this reason the brake 33 should have previously been released in order to permit the free descent of said bucket. The bucket is then lowered and permitted to swing rearwardly until its digging-teeth come in contact with the bottom of the excavation. Then the brake 33 should again be applied to the brake-wheels 32, thereby preventing the pinion 27 and said brake-wheels from turning except upon the application thereto of considerable force by the bucket-handle 25. Then the rope 23 should be slowly rewound upon the drum 19, which will thereby draw the teeth of the bucket along in contact with the earth, and so fill the bucket with material, and then the brake 33 should be released and the winding of the rope 23 continued until the bucket is elevated to the position in which it is shown. As the bucket approaches the limit of its upward movement the pintles 38 of the block 36 are caught and held by the locking frame members 41, so that when said rope 23 is slackened said bucket will be supported in an elevated position, as shown in Fig. 7. Finally, the carriage, carrying the loaded bucket, is run rearwardly by winding up the rope 20 in the manner previously described.

The construction of the machine is such that the bucket is adapted to dig a trench of greater width than the bucket, and the bucket may be moved laterally for such purpose. The pinion 27 is, as shown in Fig. 5, splined upon the shaft 28, so that said pinion and the bucket-handle 25 may be moved laterally with the bucket. The longitudinal members 53 serve as a lateral guide or rest for the upper portion of the said bucket-handle 25 and restrain the movement of same within reasonable limits.

The bucket-handle 25 is moved laterally by means of a rope 55, which is attached to common staples or eyes 56, depending from the pinion-arms 29, (see Fig. 5,) and said rope is wound upon a common windlass 57 at one side of the carriage in such manner that when said windlass is rotated in one direction the rope will draw the pinion 27 and the bucket-handle 25 toward one side of the carriage, and when said windlass is rotated in an opposite direction said rope will draw said parts toward the opposite side of the carriage. Said rope passes around a pulley 58 on the side of the carriage opposite that upon which the said windlass is located. (See Fig. 9.)

Having fully described my invention, what I claim as new, and desire to have secured to me by the grant of Letters Patent, is—

1. In a sewer-digging machine, a main frame provided with wheels, an engine mounted upon the main frame, drums actuated by the engine, a carriage traveling upon the main frame, a bucket-handle having rack-teeth and depending from the carriage, a bucket rigidly connected to the lower end of said handle, ropes connecting the carriage and bucket to the drums, means for adjusting the handle laterally and for guiding the movement thereof, and means whereby the bucket may be raised and lowered and shifted from side to side of the carriage, substantially as described.

2. In a sewer-digging machine, a main frame provided with wheels, an engine mounted upon the main frame, drums actuated by the engine, a carriage traveling upon the main frame, a bucket-handle having rack-teeth and depending from the carriage, a bucket fixed to the lower end of said handle, ropes connecting the carriage and excavating-bucket to the drums, means whereby the bucket may be raised and lowered and shifted from side to side of the carriage, a buffer mounted upon a standard at the front of the main frame, an ear upon the forward end of the carriage, and a dog mounted above the buffer and adapted to engage with the ear upon the carriage, substantially as and for the purposes specified.

3. In a sewer-digging machine, a main frame provided with wheels, an engine mounted upon the main frame, drums actuated by the engine, a carriage traveling upon the main frame, an excavating-bucket depending from the carriage, ropes connecting the carriage and excavating-bucket to the drums, and means whereby the bucket may be raised and lowered and shifted from side to side of the carriage, substantially as described.

4. In a sewer-digging machine, a main frame provided with wheels, an engine mounted upon the main frame, drums actuated by the engine, a carriage traveling upon the main frame, an excavating-bucket depending from the carriage, ropes connecting the carriage and excavating-bucket to the drums, and means consisting of the spring-pressed U-shaped pins 13 and lugs 15 for fastening down the carriage upon the front end of the main frame, substantially as described.

5. In a sewer-digging machine having a main frame, a wheeled carriage upon said main frame, an excavating implement, a rack-handle connected to said implement, a transverse shaft mounted on said carriage, a pinion splined upon said shaft and engaging the teeth of said rack-handle, means for adjusting the handle laterally, and means for guiding the movement thereof, substantially as described.

6. In a sewer-digging machine having a main frame, a wheeled carriage upon said main frame, an excavating implement, a rack-handle connected to said implement, a transverse shaft mounted on said carriage, a pinion splined upon said shaft and engaging the teeth of said rack-handle, means for adjusting the handle laterally and for guiding the movement thereof, and means for locking the carriage while digging, substantially as described.

7. In a sewer-digging machine having a main frame, a wheeled carriage upon said main frame, an excavating implement, a rack-handle connected to said implement, a transverse shaft mounted on said carriage, a pinion splined upon said shaft and engaging the teeth of said rack-handle, operating connections, two blocks and tackle for raising and lowering said excavating implement, and means for locking together said two blocks in order to retain the excavating implement in an elevated position, substantially as described.

In testimony whereof I have signed my name to this specification in presence of two subscribing witnesses.

JOHN J. HICKEY.

Witnesses:
ALFRED A. EICKS,
M. G. IRION.